United States Patent
deVries et al.

[11] 3,843,923
[45] Oct. 22, 1974

[54] WELL PIPE JOINT LOCATOR USING A RING MAGNET AND TWO SETS OF HALL DETECTORS SURROUNDING THE PIPE

[75] Inventors: Douwe deVries; Charles W. Calhoun, both of Houston, Tex.

[73] Assignee: Jim C. Stewart & Stevenson, Inc., Houston, Tex.

[22] Filed: July 5, 1973

[21] Appl. No.: 376,523

[52] U.S. Cl. .............. 324/34 R, 166/65 M, 324/37
[51] Int. Cl. ............................................ G01r 33/12
[58] Field of Search..... 324/34 R, 37; 166/64, 65 R, 166/65 M

[56] References Cited
UNITED STATES PATENTS

| | | | |
|---|---|---|---|
| 3,103,976 | 9/1963 | DeVries et al. | 324/34 R |
| 3,273,055 | 9/1966 | Quittner | 324/37 |
| 3,284,701 | 11/1966 | Kerbow | 324/37 |

Primary Examiner—Robert J. Corcoran
Attorney, Agent, or Firm—Jefferson D. Giller; James F. Weiler; William A. Stout

[57] ABSTRACT

A pipe joint locator for use in drilling underwater wells for locating pipe joints of a drill string. The locator including a ring magnet for producing a magnetic field for magnetizing pipe joints passing through the ring. A plurality of Hall effect detectors circularly positioned in a plane parallel to and spaced from the plane of the ring magnet and equally spaced apart for measuring quantitative amounts of ferrous objects. Means connected to the detectors for determining the location of any pipe joints moving through the locator. A second set of plurality of Hall effect detectors positioned in a plane parallel to the plane of the ring and spaced on a second side of a ring magnet. Preferably, each set of detectors includes four detectors spaced approximately ninety degrees apart. A tubular housing positioned internally of said magnet and detectors. The output of each set of detectors being combined for avoiding errors due to non-axial movement of the pipe through the locator. Measuring means connected to the detector combining the difference between the output of the first set of detectors and the second set of detectors.

2 Claims, 4 Drawing Figures

PATENTED OCT 22 1974

3,843,923

WELL PIPE JOINT LOCATOR USING A RING MAGNET AND TWO SETS OF HALL DETECTORS SURROUNDING THE PIPE

BACKGROUND OF THE INVENTION

The use of a magnetic pipe joint locator for locating pipe joints of a drill string relative to a blowout preventer under water is disclosed in U.S. Pat. No. 3,103,976. And the use of Hall effect detectors for locating anomalies in ferrous materials is generally disclosed in U.S. Pat. Nos. 2,942,177; 3,555,412; 3,573,616; and 3.579,099.

The present invention is generally directed to various improvements in a pipe joint locator utilizing a plurality of Hall effect detectors for accurately and simply locating pipe joints as a string of pipe moves through the locator. In addition, the present locator is able to accurately locate pipe joints in spite of vibration or non-axial movement of the pipe through the locator.

SUMMARY

The present invention is generally directed to a pipe joint locator for well pipe including a ring magnet for producing a magnetic field longitudinally through the ring for magnetizing pipe and pipe joints passing through the ring. A plurality of Hall effect detectors are circularly positioned in a plane parallel to the plane of the ring and spaced on one side of the ring for measuring quantitative amounts of ferrous objects moving through the locator. Indicating means are connected to the detectors for indicating or determining the location of any pipe joints moving through the locator.

Still a further object of the present invention is the provision of a tubular housing positioned internally of the magnet and detectors for protecting the detectors and magnet from the moving pipe.

Yet a still further object of the present invention is the provision of two sets of Hall effect detectors positioned on opposite sides of the ring magnet for accurately locating the position of a pipe joint as the joint passes through the detectors.

A still further object is the provision of providing more than two detectors in a set and spacing the detectors equally around the housing for avoiding errors due to non-axial movement of the pipe through the locator. The output of each set of detectors is combined for increased accuracy.

A still further object of the present invention is the provision of a pipe joint locator having a first set of Hall detectors and a second set of Hall detectors in which the measuring means measures the difference between the combined output from the first detectors and the combined output of the second detectors.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figures 1A, 1B:
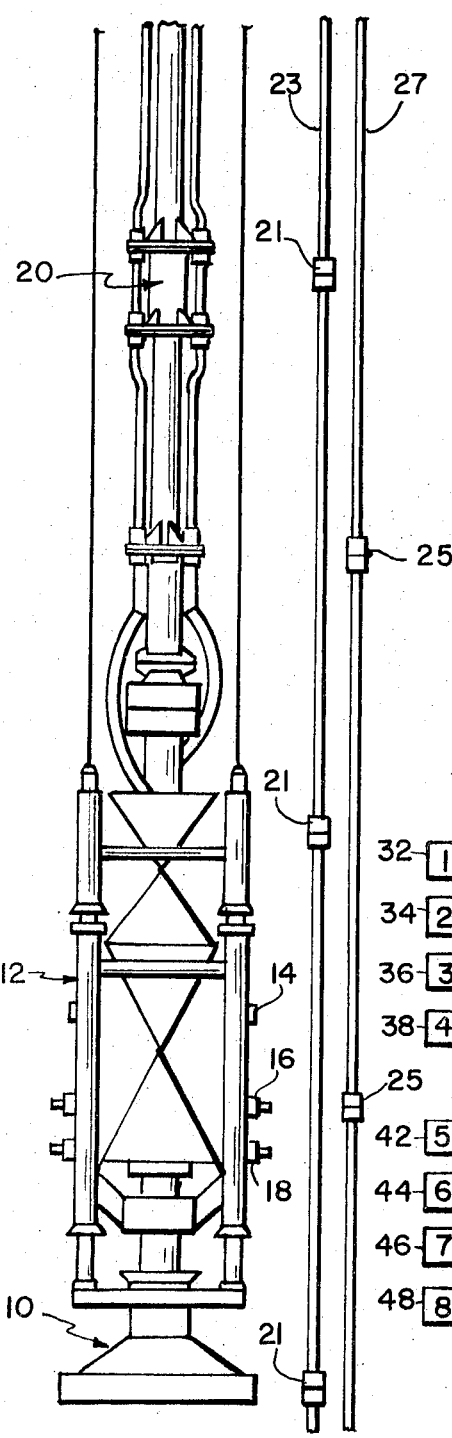
FIG. 1A is a schematic elevational view illustrating the placement of a pipe joint locator relative to a blowout preventer for locating the position of any pipe joint relative to the blowout preventer.
FIG. 1B is an elevational view of two drill pipe strings relative to the apparatus of FIG. 1A showing the proper and improper positioning of a pipe string prior to closing the blowout preventer of FIG. 1A.

Referring now to the drawings and particularly to FIG. 1A, a well head structure generally indicated by the reference numeral 10 is shown suitably anchored to the underwater floor with a blowout preventer 12 having a plurality of rams 14, 16 and 18, and the pipe joint locator of the present invention generally indicated by the reference numeral 20 connected thereabove. Pipe joints, such as joints 21, of drilling pipe 23, and joints 25 of pipe 27 (FIG. 1B) are larger in outside diameter and have a greater mass of material than the normal diameter of the rest of the drilling pipe string. The blowout preventer 12 is employed on a well for controlling well pressures under emergency conditions by closing the rams 14, 16 and 18 in a fluid tight manner around the drill pipe, but not around the larger diameter pipe joints thereof. Therefore, it is necessary to know the location of the tool joints relative to the blowout preventer before closing the rams 14, 16 and 18 thereof. Since the location of the pipe joint locator 20 relative to the blowout preventer 12 is known and the length of the joints of drill pipe are known, the relative position of a pipe joint to the blowout preventer 12 may be ascertained by locating the pipe joints with the locator 20. Using the locator 20, the pipe string is put in position as shown by string 23 prior to closing blowout preventer 12.

Figure 2:
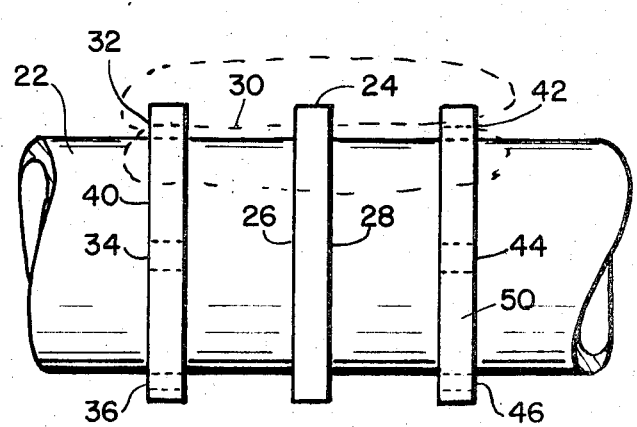
FIG. 2 is a schematic elevational view of the pipe locator of the present invention.

Referring now to FIG. 2, the pipe joint locator 20 of the present invention generally includes a tubular housing 22 and a magnetic ring 24 which may be an electromagnetic or a permanent magnet having a north pole on one side 26 and a south pole on the other side 28 for providing a magnetic field generally indicated by the reference numeral 30 in the longitudinal direction of the tubular housing 22. The field 30 encompasses the drill pipe as it passes through locator 20. As the drill pipe and joints enter the field 30, they cause the lines of force to assume a different path.

A plurality of Hall effect detectors, preferably four, 32, 34, 36 and 38, are circularly positioned in a plane parallel to the plane of the ring 24 and spaced on one side of the ring magnet for measuring quantitative amounts of ferrous objects. A Hall effect detector utilizes the Hall effect named after E. H. Hall who observed that when a conducting material is placed in a magnetic field perpendicular to the direction of current flow, a voltage is developed across the material in a direction perpendicular to both the initial current direction and the magnetic field. The voltage results from the deflection of the moving charge carriers from their normal path by the applied magnetic field and its resulting transverse electric field. The detector is selected to have favorable properties so that the voltage developed is measurable and responsive. Detectors utilizing derivatives of the element Indium such as Indium antimonide or Indium arsenide have been found to be satisfactory.

The Hall effect detectors 32, 34, 36 and 38 are suitably supported by a nonmagnetic ring 40. Therefore, the Hall effect detectors 32, 34, 36 and 38 produce a voltage proportional to the strength of the field 30 and to the direction of the field 30. A magnetic field perpendicular to a Hall detector will cause a voltage to be produced; however, when the field is parallel to the detector, little voltage will be produced. When a ferrous metal pipe such as a length of drill pipe is inserted in the assembly, an increase in voltage will be produced by the detectors 32, 34, 36 and 38. And when an enlarged diameter pipe joint such as joint 21 or 25 enters the magnetic field 30 and is positioned adjacent the Hall detectors 32, 34, 36 and 38, the magnetic field perpendicular to the detectors will change.

While only a single Hall detector theoretically need be used to detect the presence of a pipe joint, it is desirable to use more than two detectors, and preferably four as shown, in order to better detect the presence of a tool joint since a joint may not be exactly centered in the housing 22 as it passes therethrough. The four cells 32, 34, 36 and 38 are equally spaced 90° apart and therefore in the event the tool joint is off-centered in the housing 22 while the output voltage in one detector may be less, the output voltage in the opposite detector will be greater. The use of the plurality of cells will allow detection of a tool joint with greater repeatability regardless of the off-center position of the pipe and joints. The voltages produced by the four detectors 32, 34, 36 and 38, are then combined producing a combined signal four times greater than using only one detector, as will be more fully discussed hereinafter such as to provide an output which would be indicative of the presence of a pipe joint. For increased accuracy, a second set of plurality of Hall effect detectors 42, 44, 46 and 48 are provided circularly positioned in a plane perpendicular to the plane of the magnet ring 28 and on the second side thereof and supported by a suitable non-magnetic ring support 50. There are several advantages to using a second set of Hall detectors. First, there are always some lines of force in the magnetic field 30 that do intersect a detector at an angle sufficient to produce a voltage and it is desirable to offset this small error signal. By combining the output of the detectors on ring 40 with the detectors on ring 50, the error signals will be offset. Thus, if any outside magnetic field happens to enter a cell on ring 40, it will also enter a corresponding cell on ring 50 and by comparing the two cells, as will be discussed hereafter, this error signal will be cancelled out. The same is true of errors produced by temperature effects. In addition, the use of a second set of Hall detectors provides a confirmatory signal as to the location of objects passing through locator 20.

So long as the amounts of a ferrous object inside the tubular housing is the same under the ring 40 as the ring 50 the output of the detectors 32, 34, 36 and 38 will be the same having no pipe joints extending through the locator housing 22 beneath the detectors in rings 40 and 50, the output from each of the two sets of detectors will be the same. Similarly, if there is no pipe inside of the tubular housing 22, the output from detectors on ring 40 will equal the output from the detectors on ring 50.

However, if a mass of ferrous material such as a pipe joint is placed under ring 40 but not under ring 50, then a resultant voltage would be produced from the detectors on ring 40 but not from the detectors on ring 50. On the other hand, if a pipe joint is placed under ring 50 but not under ring 40, then the detectors on ring 50 will produce a resultant voltage but the detectors on ring 40 will not produce a voltage.

The output from the detectors 32, 34, 36 and 38 may be combined with the output voltage from the detectors 42, 44, 46 and 48 to compensate for error signals. In such a case, if there were no ferrous metal inside the tubular housing 22 or if equal amounts of ferrous metal were placed under both rings 40 and 50, the resultant voltage from the combined outputs of the detectors on rings 40 and 50 would be zero. However, if a mass of ferrous material were placed under ring 40 but not under ring 50, then a resultant voltage would be produced. And if the mass of ferrous material were placed under ring 50 and not under ring 40, then a voltage of similar magnitude as the prior example would be produced, but of opposite polarity.

Figure 3:
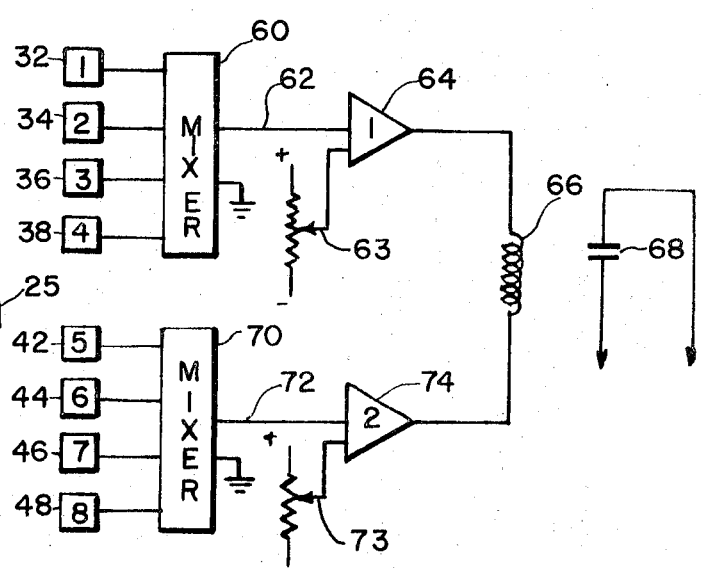
FIG. 3 is an electrical schematic of the electrical connection of the pipe joint locator of the present invention.

Referring now to FIG. 3, the preferred method of connecting the Hall effect detectors to an indicating means is best seen. Preferably, each of the detectors on ring 40, such as detector 32, 34, 36 and 38, have their output connected to suitable means for combining the outputs of the detectors such as a conventional mixer 60 having an output 62 which may be the combined output of the individual detectors or the average of the individual detectors 32, 34, 36 and 38. Similarly, the detectors 42, 44, 46 and 48 are connected to a suitable mixer 70 having an output 72 for combining the outputs of these detectors to provide an average or a combined output. Preferably, the detectors on ring 40 are matched with the corresponding positioned detector on ring 50. Thus detector 34 on ring 40 would be matched with detector 44 on ring 50 and so forth.

The output 62 may be passed through a conventional amplifier 64 to one side of a relay 66. The output 72 may be transmitted through an amplifier 74 to a second side of a relay 66. The outputs 62 and 72 may be adjusted by controls 63 and 73, respectively, to further match the outputs from the detectors on ring 40 with the detectors on ring 50. The relay 66 may control suitable indicating means such as closing a normally open contact 68 which may lead to the water surface for actuating a suitable indicator such as a light or meter.

In use, when a ferrous metal drill pipe is inserted and moves through the housing 22 of the detector 20, a differential voltage would be produced across the relay 66 when the pipe enters one of the ring 40 or 50. When the pipe extends entirely through the assembly and the rings 40 and 50, there would be no differential voltage because each output from the amplifiers 64 and 74 would be detecting equal masses of ferrous material under the rings 40 and 50.

And when a pipe joint entered into one of the rings 40, a voltage would be produced because the detectors on ring 40 would have more metal for deflecting the magnetic field 30 then in the detectors in ring 30. Of course, when the tool joint was exactly half-way through the housing 22, the resultant voltage from the amplifiers 64 and 74 would be equal, and when the tool joint moved through the housing 22 and was located only under the ring 50, a differential voltage would be produced across the relay 66 but of opposite polarity since it would be transmitted only from the amplifier 74. Therefore, as a tool joint moves through the housing 22, the relay 66 would be actuated when the tool joint initially entered the ring 40, would be deactuated when the tool joint was in both rings 40 and 50, and would again be actuated as the tool joint leaves ring 50. Therefore, referring to FIG. 1B, the locator 20 may be used to place a drill string and pipe joints in the position as shown by string 23 and joints 21 prior to closing blowout preventer 12. Obviously, it is undesirable to have a string and joints positioned such as string 27 and joints 25 as the blowout preventer 12 would be actuated against a joint 25.

The power to the Hall effect detectors can be either ac or dc of a voltage necessary to place a suitable current through the input leads of each detector and the signal output leads would be an ac signal if ac is used on the input, and dc if dc is used on the input. The locator 20 would require two power leads and two signal wires leading to the surface.

Therefore, the pipe locator 20 provides a plurality of sensitive signals by using a plurality of sets of detectors for easily and accurately locating the position of a pipe joint.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A pipe joint locator for well pipe comprising,
   a tubular housing through which pipe and connecting joints may be moved,
   a ring magnet positioned about the housing for producing a magnetic field axially through the housing,
   a first set of four Hall effect detectors circularly positioned about the outside of said housing and spaced on one side of the ring magnet for measuring a deflection of the magnetic field caused by the movement of a pipe joint through the magnetic field,
   a second set of four Hall effect detectors circularly positioned about the outside of said housing and spaced on the second side of the ring magnet for measuring a deflection of the magnetic field caused by the movement of a pipe joint through the magnetic field,
   the output of the first set of detectors being combined,
   the output of the second set of detectors being combined, and
   means connected to said outputs for determining the location of any pipe joints moving through the locator.

2. The apparatus of claim 1 wherein the difference between the combined output from the first set of detectors and the combined output of the second set of detectors is measured.

* * * * *

UNITED STATES PATENT OFFICE
CERTIFICATE OF CORRECTION

Patent No. 3,843,923                Dated October 22, 1974

Inventor(s) Douwe de Vries and Charles W. Calhoun

It is certified that error appears in the above-identified patent and that said Letters Patent are hereby corrected as shown below:

Correct assignee's name from "Jim C. Stewart & Stevenson, Inc." to -- C. Jim Stewart & Stevenson, Inc. --

Signed and sealed this 7th day of January 1975.

(SEAL)
Attest:

McCOY M. GIBSON JR.
Attesting Officer

C. MARSHALL DANN
Commissioner of Patents